Figure 1:
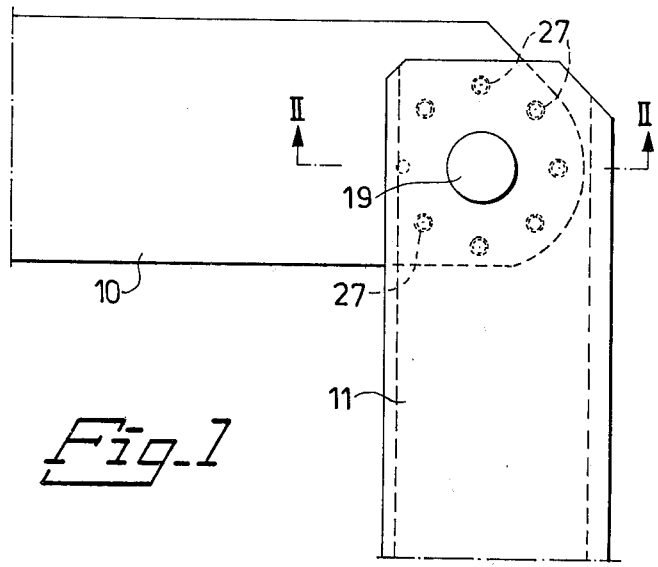

United States Patent [19]

Persson

[11] 4,446,627

[45] May 8, 1984

[54] ARRANGEMENT IN ANGLE RULERS FOR IMPROVING FIXTURE OF AN ANGULARLY ADJUSTABLE BLADE OF SAID RULERS TO THE STOCK THEREOF IN SELECTED BLADE POSITIONS RELATIVE THERETO

[76] Inventor: Bengt Persson, Pl. 577, 830 02 Mattmar, Sweden

[21] Appl. No.: 409,953

[22] Filed: Aug. 20, 1982

[30] Foreign Application Priority Data

Sep. 21, 1981 [SE] Sweden ............................... 8105567

[51] Int. Cl.³ .............................................. B43L 7/06
[52] U.S. Cl. .......................................... 33/497; 33/418
[58] Field of Search ................................... 33/465–469, 33/418, 423, 424, 495–500, 403

[56] References Cited

U.S. PATENT DOCUMENTS

| 1,638,200 | 8/1927 | Hester | 33/499 |
| 2,775,037 | 12/1956 | Baumunk | 33/499 |
| 2,920,392 | 1/1960 | Stromquist | 33/424 |

FOREIGN PATENT DOCUMENTS

| 1012539 | 7/1957 | Fed. Rep. of Germany | 33/438 |
| 50622 | 10/1940 | France | 33/438 |

Primary Examiner—Harry N. Haroian
Attorney, Agent, or Firm—Hammond & Littell, Weissenberger and Muserlian

[57] ABSTRACT

In an arrangement in angle rulers for improving the fixture of an angularly adjustable blade (10) of said rulers to the stock (11) thereof in selected angular positions relative thereto, the stock (11) comprises a rectangular hollow section having a lateral opening (17), the blade (10) being arranged to be partly surrounded by the hollow profile of the stock. A spring-loaded (20), displaceable peg (19) is arranged to extend through at least one (12) of the mutually opposing walls (12,13) of the stock, and through the blade (10). One surface of the blade exhibits grooves or promontories (27) arranged to co-act with corresponding grooves or promontories (26) in the inwardly facing surface of the wall (12), whereat both grooves (27) and promontories (26) concentrically encircle the peg (19), around which peg the blade (10) is arranged to pivot.

4 Claims, 2 Drawing Figures

ARRANGEMENT IN ANGLE RULERS FOR IMPROVING FIXTURE OF AN ANGULARLY ADJUSTABLE BLADE OF SAID RULERS TO THE STOCK THEREOF IN SELECTED BLADE POSITIONS RELATIVE THERETO

The object of the present invention is to provide an arrangement in angle rulers for improving fixture of an angularly adjustable blade of said rulers to the stock thereof in selected blade positions relative thereto. By "angle ruler" as used here and in the following is meant to include such rulers as T-square, try squares, set squares etc.

Angle rulers having blades which can be adjusted to selected angular positions are mostly of the kind described and illustrated, for example, in German Patent Specification No. 827 300. The stock of the angle ruler is provided with a semi-circular groove or slot and the blade is connected to the stock by means of a screw in a manner which permits movement of the blade relative to the stock. By loosening the screw, the blade can be smoothly adjusted to given angular positions, whereafter the position of the blade relative to the stock is locked by tightening the screw, which therewith forms a friction lock. Friction locks of this kind are not generally satisfactory. Firstly, locks of this kind require the screw to be tightened sufficiently, which at times may require a great deal of force. Secondly, the screw thread is subjected to wear, which gradually has a negative effect on reliably locking the blade in the selected position. In practice, angle rulers are often set to predetermined angles, such as angles of 45°, 90°, 135°.

A prime object of the present invention is to provide an angle ruler with which the blade can be reliably locked in position relative to the stock at a number of given angular positions.

Another object of the invention is to provide an angle ruler of the kind mentioned provided with means which enables the blade to be adjusted from one angular position to another in a quick and sure fashion.

To this end there is provided in accordance with the invention an angle ruler of the kind described in the introduction, which is characterized in that the stock comprises a rectangular hollow section having a laterally directed opening; in that the blade is arranged to be partially surrounded by the hollow section of said stock; in that a spring-loaded actuable peg extends through at least one of the mutually opposing walls of the stock and through the blade; and in that one surface of the blade has arranged thereon grooves or promontories, such as balls, arranged to co-act with grooves or promontories, such as balls, or grooves on the inwardly facing surface of said wall, whereat both grooves and promontories concentrically surround said peg, around which peg the blade is arranged to pivot.

Figure 2:
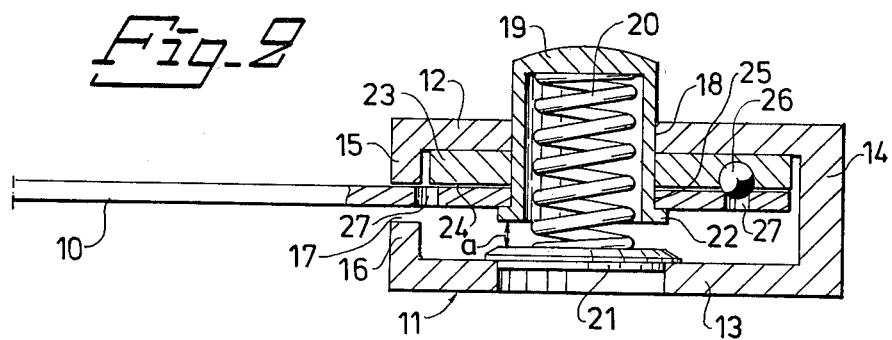

An exemplary embodiment of the invention will now be described in more detail with reference to the accompanying drawing, in which FIG. 1 is a top plan view of an angle ruler according to the invention, and FIG. 2 is a sectional view taken on the line II—II in FIG. 1.

An angle ruler according to the invention comprises a blade 10 and a stock 11. The stock 11 comprises a rectangular hollow profile having mutually opposing walls 12 and 13 and an end wall 14. On the end thereof remote from the end wall 14 the stock 11 exhibits two mutually facing legs 15, 16, whose ends terminate at a distance from one another and between which there is formed a lateral opening 17. The wall 12 has arranged therein a bore 18 in which a hollow peg 19 is displaceably mounted. Arranged in the cavity in the peg 19 is a compression spring 20. One end of the spring 20 abuts the bottom of the hollow peg 19, while the other end of the spring abuts a flange 21 arranged on the inside of the wall 13. Bonded to the inner surface of the wall 12 is a reinforcement 23 which extends to the level of the face of leg 15. As will be understood, this reinforcing wall 23 may also be integral with the wall 12, such that the thickness of the wall 12 equals the length of the leg 15. The free portion of the reinforcing wall 23 of the illustrated embodiment forms an abutment surface 24.

Arranged at one end of the blade 10 is a hole or bore 25, the diameter of which is slightly greater than the diameter of the peg 19, and the blade 10 is fitted onto the peg 19 and positioned behind a flange 22 on said peg. The free end of the blade 10 extends out through the opening 17.

With the peg 19 as the centre, the abutment surface 24 exhibits a plurality of balls 26, which may be either fixed or moveably mounted and which partially project downwardly out of the plane of the abutment surface 24. The balls 26 may also be replaced with spherical or part-spherical promontories. Each ball lies at the same distance from the centre of the peg 19. The number of balls provided depends upon the number of different angles to which the blade 10 can be adjusted relative the stock 11.

According to a preferred embodiment, the angular positions to which the blade can be set are angles of 45°, 90° and 135°, and to this end seven balls 26 are arranged concentrically around the peg 19 and equidistant therefrom. As will be understood, the balls or spherical or part-spherical promontories 26 are arranged to co-act the one another to lock the blade 10 to the stock at selected angular positions thereto. When moving the blade 10 from one angular position to another, the peg 19 is depressed against the action of spring 20. Because the blade 10 is passed through the peg 19, the blade will also be pressed downwardly towards the flange 21, wherewith the balls 26 are moved out of engagement with the grooves or bores 27.

The blade 10 is mounted on the peg 19 so as to obtain a certain clearance therewith and, at the moment of being depressed, is freely moveable around the peg. When pressure is removed from the peg 19, the blade 10 will attempt to move upwardly under the action of the spring 20. When the blade has been moved to a position in which the balls 26 lies against those blade surfaces located between the bores 27, it is only necessary to move the blade towards the desired angular position, and when this position is reached the balls 26 will snap into the co-acting bores 27. The blade 10 is, in this way, reliably locked in the desired position, in which position the surface 24 also forms a part which stiffens the blade 10. Thus, the force which fixes the blade 10 is of optimal magnitude and ensures that the blade will not be moved unintentionally from the position to which it has been set. The abutment pressure or moment of force comprises the whole of the diameter of the circle defined by the balls 26 and the bores 27 respectively, with the peg 19 as the centre of said circle. As will be seen, the only function of the peg 19 is to rapidly release the blade 10 from locking engagement with the balls.

In the illustrated embodiment, the balls 26 only partially enter respective bores 27, which facilitates setting of the blade angle.

The blade 10 may be provided with graduations in a known manner, to indicate the angular positions to which the blade can be set.

The abovedescribed design principle can also be applied to obtain other angular positions than those mentioned with reference to the illustrated embodiment. All that is necessary is to increase the number of balls and bores, i.e. decrease the mutual spacing between two adjacent balls or holes respectively.

I claim:

1. An angle ruler having a stock, an angularly adjustable blade and an arrangement for improved fixture of said angularly adjustable blade to said stock in selected angular positions, said arrangement comprising a rectangular hollow section being partially embraced by one end of said stock, wherein one of the two shorter sides of said hollow section is provided with a lateral opening defined by two opposed wall portions, a spring-loaded displaceable peg penetrating at least one of the mutually opposing walls of said hollow section and a bore of said blade, grooves provided on one of the inwardly facing surface of one of said walls and the opposite surface of said blade, and balls co-acting with said grooves on the other one of said surfaces, said grooves and balls being equally spaced and concentrically encircling said peg, around which said blade is arranged to pivot.

2. The angle ruler according to claim 1, wherein said peg in said arrangement is provided with an outwardly arranged flange, said blade being positioned between said flange and and the inwardly facing surface of said one wall.

3. The angle ruler according to claim 1, wherein said peg in said arrangement is hollow cylinder having a closed bottom, and further comprising a coil spring resting between said bottom and a flange on the inwardly facing surface of the other of said walls.

4. The angle ruler according to claim 1, wherein said bore of the blade has a diameter larger than the diameter of said peg, so as to provide a clearance between the defining wall of said bore and the outer surface of said peg.

* * * * *